(12) United States Patent
Brown et al.

(10) Patent No.: US 8,218,434 B1
(45) Date of Patent: Jul. 10, 2012

(54) ETHERNET FACILITY AND EQUIPMENT PROTECTION

(75) Inventors: Christopher Brown, Ottawa (CA); David Yeung, Nepean (CA); Charlie Kawwas, Dollard-des-Ormeaux (CA); Craig Suitor, Nepean (CA); Brodie Gage, Ste-Anne-de-Bellevue (CA)

(73) Assignee: Ciena Corporation, Linthicum, MD (US)

( * ) Notice: Subject to any disclaimer, the term of this patent is extended or adjusted under 35 U.S.C. 154(b) by 668 days.

(21) Appl. No.: 11/250,666

(22) Filed: Oct. 14, 2005

Related U.S. Application Data

(60) Provisional application No. 60/619,462, filed on Oct. 15, 2004.

(51) Int. Cl.
*G01R 31/08* (2006.01)
(52) U.S. Cl. ......................................... 370/227
(58) Field of Classification Search .............. 370/216, 370/217, 225, 221, 220, 219, 222, 223, 229, 370/227, 228, 247, 241, 389, 235, 237, 218
See application file for complete search history.

(56) References Cited

U.S. PATENT DOCUMENTS

| | | | | |
|---|---|---|---|---|
| 5,521,913 A * | 5/1996 | Gridley | ......................... | 370/389 |
| 5,991,303 A * | 11/1999 | Mills | ............................. | 370/402 |
| 6,246,690 B1 * | 6/2001 | DiPlacido et al. | ............ | 370/408 |
| 6,735,636 B1 * | 5/2004 | Mokryn et al. | ................... | 710/5 |
| 6,766,482 B1 * | 7/2004 | Yip et al. | ....................... | 714/717 |
| 6,981,174 B1 * | 12/2005 | Hanning | ........................ | 714/5.1 |
| 7,027,390 B2 * | 4/2006 | Wakai et al. | .................. | 370/218 |
| 7,324,500 B1 * | 1/2008 | Blackmon et al. | ............ | 370/351 |
| 2003/0048746 A1 * | 3/2003 | Guess et al. | .................. | 370/219 |
| 2004/0255186 A1 * | 12/2004 | Lau | .................................... | 714/6 |
| 2005/0105545 A1 * | 5/2005 | Thousand et al. | ............ | 370/442 |
| 2007/0022331 A1 * | 1/2007 | Jamieson et al. | ............. | 714/712 |

* cited by examiner

*Primary Examiner* — Kwang B Yao
*Assistant Examiner* — Anh Ngoc Nguyen
(74) *Attorney, Agent, or Firm* — Christopher & Weisberg, P.A.

(57) ABSTRACT

Described is a system and method of protection switching in an Ethernet network. First and second point-to-point Ethernet links are established to data equipment. Identical streams of Ethernet traffic are received at a first Ethernet port and at a second Ethernet port. The stream of Ethernet traffic being received at the first Ethernet port is transmitted to the data equipment over the first point-to-point Ethernet link, while the second Ethernet port is prevented from transmitting the stream of Ethernet traffic received at the second Ethernet port. During a protection switch, transmission of Ethernet traffic ceases over the first point-to-point Ethernet link, and commences over the second point-to-point Ethernet link, the second Ethernet port transmitting the stream of Ethernet traffic being received at the second Ethernet port to the data equipment.

19 Claims, 12 Drawing Sheets

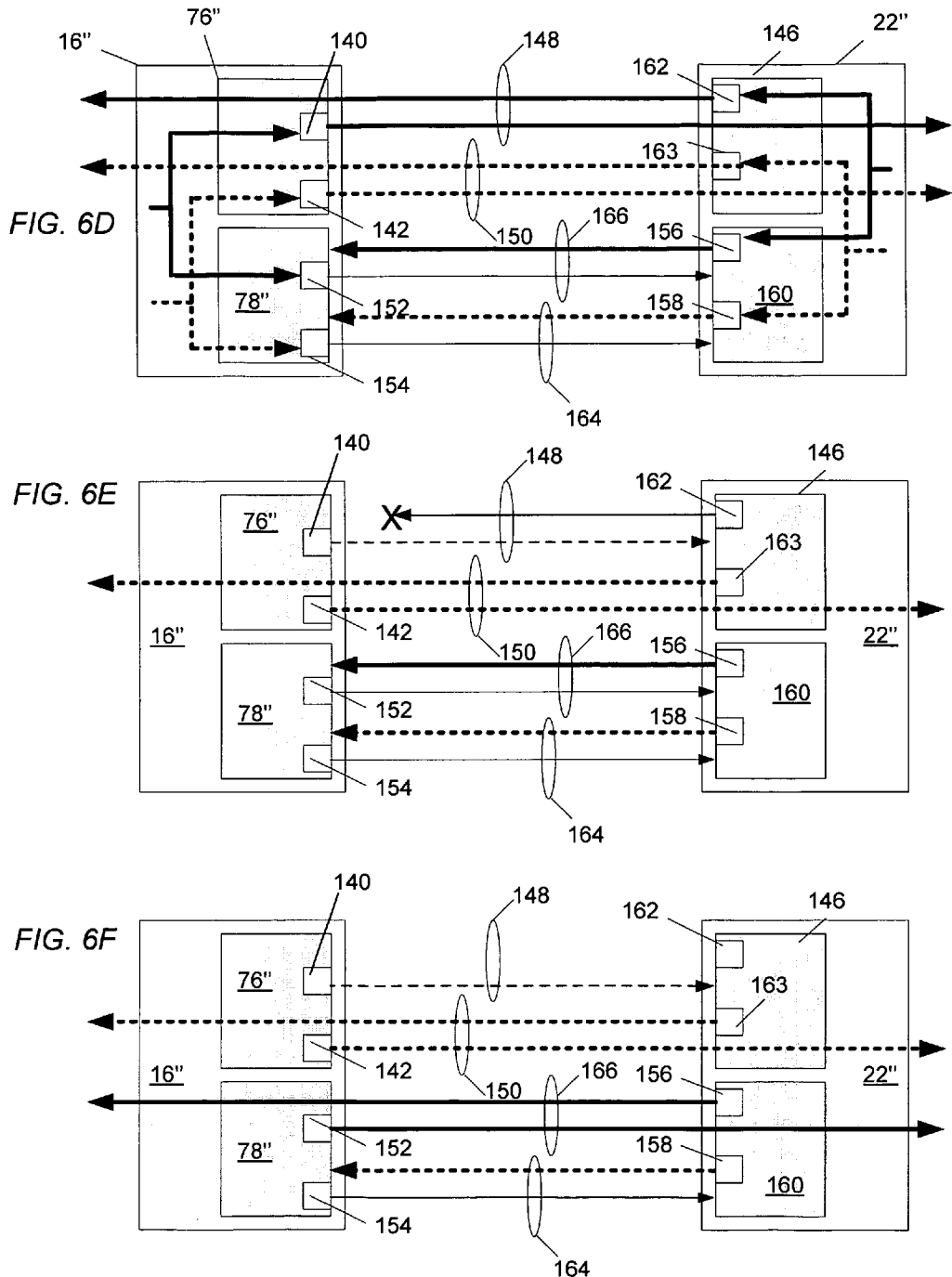

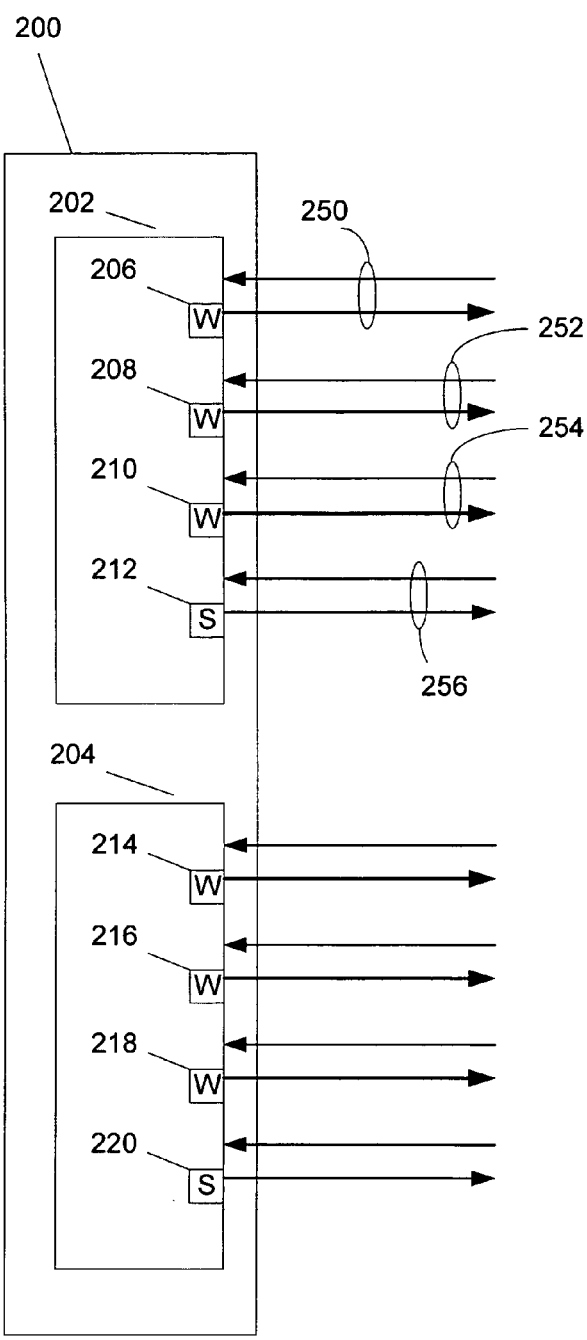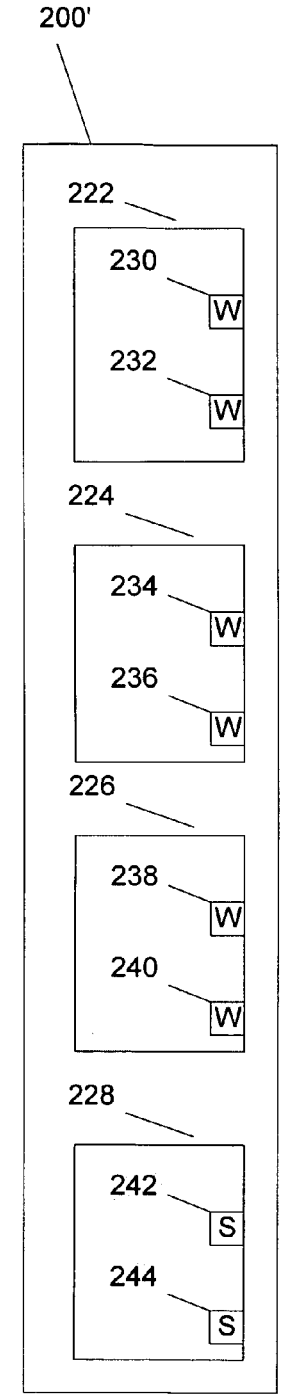
FIG. 10A
FIG. 10B

ETHERNET FACILITY AND EQUIPMENT PROTECTION

RELATED APPLICATION

This application claims the benefit of the filing date of U.S. Provisional Application Ser. No. 60/619,462, filed Oct. 15, 2004, titled "Ethernet Facility and Equipment Protection," the entirety of which provisional application is incorporated by reference herein.

FIELD OF THE INVENTION

The invention relates generally to communication networks. More specifically, the invention relates to protection switching in optical Ethernet networks.

BACKGROUND

Automatic protection switching (APS) is a service restoration capability of network elements (nodes) in an optical transport network for protecting against line and path failures. APS is part of the SONET (Synchronous Optical Network) and SDH (Synchronous Digital Hierarchy) optical transport standards. Traditionally, a line comprises one or more SONET (or SDH) sections or spans between SONET (or SDH) network elements, and a path is a logical connection between those points where service traffic is added to and dropped from the transport network. In general, the network elements supporting APS can detect a line or path failure and transfer affected traffic to a redundant link.

The SONET and SDH standards specify various protection schemes according to which network elements can perform line and path protection. Such protection schemes depend upon the various transport network architectures in which the schemes are operating, such as linear networks and ring networks (virtual line-switched ring or VLSR, unidirectional path-switched ring or UPSR, two- and four-fiber bi-directional line switched rings or BLSR). Linear protection schemes include 1+1, 1:1, and 1:N. For 1+1 and 1:1 protection schemes, one protection path serves to protect one working path or one standby link protects one working link.

In a 1+1 protection scheme, for example, the head-end network element permanently bridges the head-end signal to both working and protection equipment to transmit identical traffic to respective working and protection equipment of the tail-end network element. The tail-end network element continuously monitors both the working and protection signals for failures and automatically selects the protection signal in the event of an optical fiber or node failure. Switches can occur automatically because of line conditions, e.g., loss-of-signal (LOS) and loss-of-frame (LOF), or through user-initiated commands, e.g., manual switch, forced switch, and lockout of protection. In a 1:N protection scheme, a single optical protection path or section protects any one of N working paths or sections.

For Ethernet services, e.g., Gigabit Ethernet, the protection provided within the boundaries of an optical transport network, however, often does not extend beyond its edges, where the optical transport network handoffs Ethernet service traffic to data equipment, such as an Ethernet switch. Rather, in most Ethernet network configurations, the Ethernet service traffic passes over a single link from the tail-end network element to the data equipment, because Ethernet links between such devices are not redundant. Hence, this single link represents, at the physical layer, an undesirable single point of failure for Ethernet services.

SUMMARY

In one aspect, the invention features a method of protection switching in an Ethernet network. First and second point-to-point Ethernet links to data equipment are established. Identical streams of Ethernet traffic are received at a first Ethernet port and at a second Ethernet port. The stream of Ethernet traffic being received at the first Ethernet port is transmitted to the data equipment over the first point-to-point Ethernet link, while the second Ethernet port is prevented from transmitting the stream of Ethernet traffic received at the second Ethernet port. During a protection switch, the method ceases transmission of the stream of Ethernet traffic received at the first Ethernet port to the data equipment over the first point-to-point Ethernet link, and commences transmission of the stream of Ethernet traffic being received at the second Ethernet port to the data equipment over the second point-to-point Ethernet link.

In another aspect, the invention features a network, comprising a first network element and a second network element. The second network element has an Ethernet interface with a working Ethernet port and a standby Ethernet port. The working and standby Ethernet ports receive identical streams of Ethernet traffic. The working Ethernet port is connected to the first network element over a first point-to-point Ethernet link and the standby Ethernet port is connected to the first network element over a second point-to-point Ethernet link. The Ethernet interface transmits the stream of Ethernet traffic being received at the first Ethernet port to the first network element over the first point-to-point Ethernet link, while preventing the second Ethernet port from transmitting the stream of Ethernet traffic received at the second Ethernet port. During a protection switch, the Ethernet interface (1) ceases transmission of the stream of Ethernet traffic received at the first Ethernet port to the first network element over the first point-to-point Ethernet link, and (2) commences transmission of the stream of Ethernet traffic being received at the second Ethernet port to the first network element over the second point-to-point Ethernet link.

In still another aspect, the invention features a network element, comprising first and second Ethernet ports receiving identical streams of Ethernet traffic. The network element also includes program code for transmitting the stream of Ethernet traffic received at the first Ethernet port to data equipment over a first point-to-point Ethernet link, while preventing the second Ethernet port from transmitting the stream of Ethernet traffic received at the second Ethernet port. In addition, the network element includes program code for performing a protection switch by ceasing transmission of the stream of Ethernet traffic received at the first Ethernet port to the first network element over the first point-to-point Ethernet link, and commencing transmission of the stream of Ethernet traffic being received at the second Ethernet port to the first network element over the second point-to-point Ethernet link.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIGS. 6D-6F are block diagrams sequentially illustrating an example of automated, bidirectional Ethernet protection switching

FIGS. 10A-10B are block diagrams illustrating different embodiments of an Ethernet interface configured to provide 1:N protection.

DETAILED DESCRIPTION

In general, embodiments of the present invention include an Ethernet point-to-point protection mechanism that can eliminate single points of failure between network elements, particularly at handoff points between an optical Ethernet transport network and Ethernet data equipment (e.g., Ethernet routers and switches). In brief overview, a network element configured to support the protection mechanism has multiple Ethernet ports: one port operates as a working port and another port operates as a standby port. The working port and standby ports connect to corresponding ports of the Ethernet data equipment over different optical links. Identical streams (or feeds) of Ethernet service traffic pass to the working and standby ports. Under normal operating conditions, the working port forwards the Ethernet service traffic to the Ethernet data equipment, while the standby port does not. Instead, the standby port has "transmit data" disabled and, thus, transmits an idle signal to the Ethernet data equipment, or has its laser turned off so that it transmits no optical signals.

The Ethernet data equipment to which the network element forwards the Ethernet service traffic also has multiple Ethernet ports. One of these Ethernet ports receives the idle signaling (or no signal at all) from the standby port of the network element. Another of these Ethernet ports receives the Ethernet service traffic forwarded by the working port. If this Ethernet port detects a failure in the Ethernet traffic forwarded to it by the working port, the Ethernet port sends certain signals back to the network element. In one embodiment, these certain signals correspond to the initiation of an auto-negotiation sequence.

The working port of the network element receives these certain signals from the Ethernet data equipment and automatically initiates a protection switch. As a result, the working port stops forwarding its feed of Ethernet service traffic and starts sending idle signaling (or turns off its laser), while the standby port starts forwarding its feed of Ethernet service traffic to the Ethernet data equipment. Hence, embodiments of the invention have automatic Ethernet protection switching capabilities, and provide redundancy without transmitting redundant streams to the Ethernet data equipment. The protection switching can be revertive or non-revertive, at the discretion of an administrator who provisions the network element to perform the protection switching in accordance with various parameters.

Figure 1:
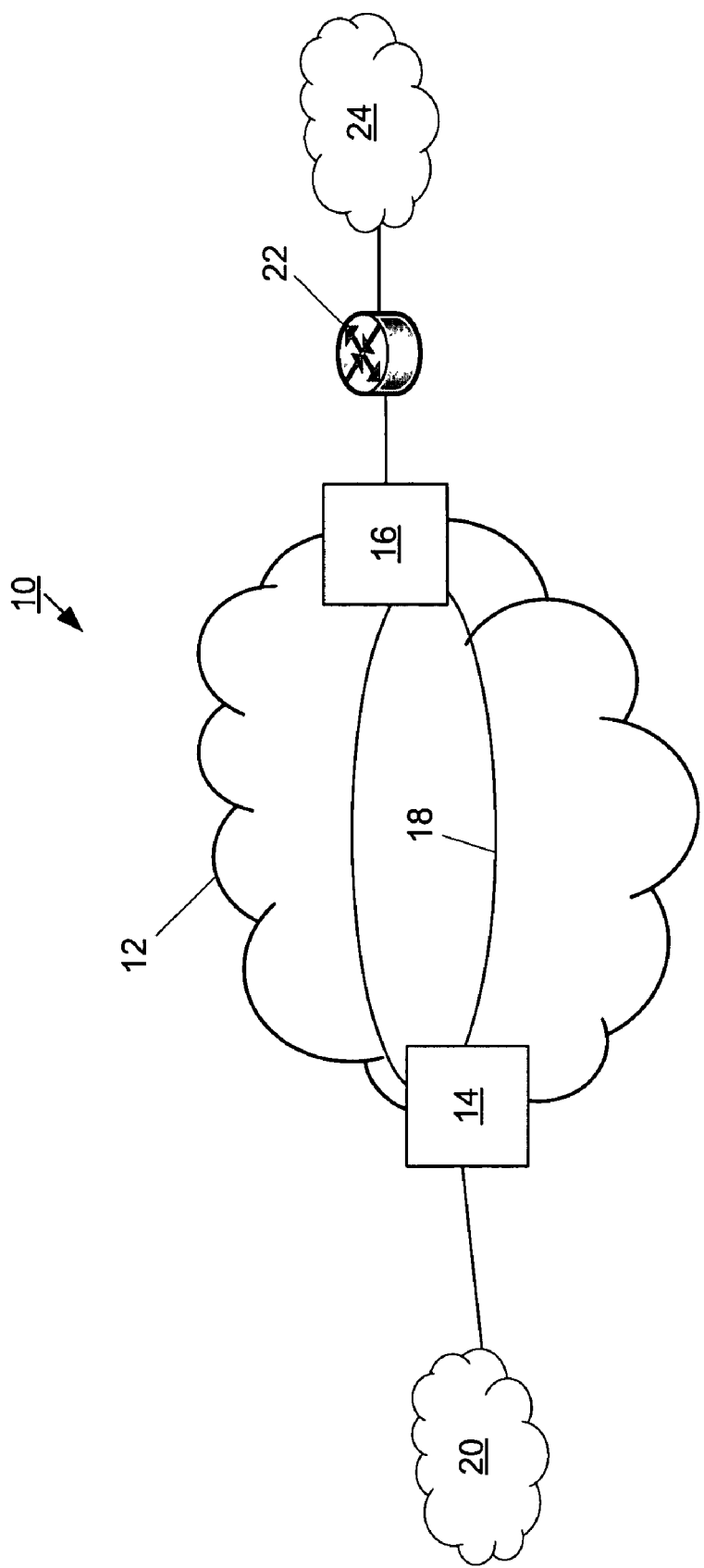
FIG. 1 is an exemplary networking environment in which aspects of the invention may be implemented.

FIG. 1 shows an embodiment of a networking environment 10 in which aspects of the invention may be practiced. The networking environment 10 can have arbitrary size and complexity. In this embodiment, the networking environment 10 includes an optical transport network 12 having a plurality of network elements (nodes) 14, 16. The optical transport network 12 can be a metropolitan area network (MAN) or a wide area network (WAN), such as the Internet. Exemplary implementations of the optical transport network 12 include SONET (Synchronous Optical Network) and SDH (Synchronous Digital Hierarchy). Here, as an example, the network elements 14, 16 are part of an optical ring 18. Alternatively, the network elements 14, 16 can be part of other type of network topologies, such as linear point-to-point, linear add/drop multiplexer (ADM), or mesh network.

The network element 14 is in communication with a client network 20 for receiving Ethernet (Layer-2) service traffic (e.g., 10/100/1000 Mbps Ethernet and Gigabit Ethernet (GE)) therefrom. Ethernet Service traffic from the client network 20 enters the optical transport network 12 through the network element 14, traverses the optical ring 18, and leaves the optical transport network 12 through the network element 16. The network element 16 is in communication with data equipment 22 for forwarding the Ethernet service traffic towards a destination network 24 (e.g., a local area network or LAN). Hereafter, network element 14 is referred to as a source network element, and network element 16 as a sink network element. In general, the data equipment 22 is also a network element, e.g., an Ethernet switch or router, which, for clarity purposes, is referred to as data equipment to distinguish it from the other network elements mentioned in this description.

Figure 2:
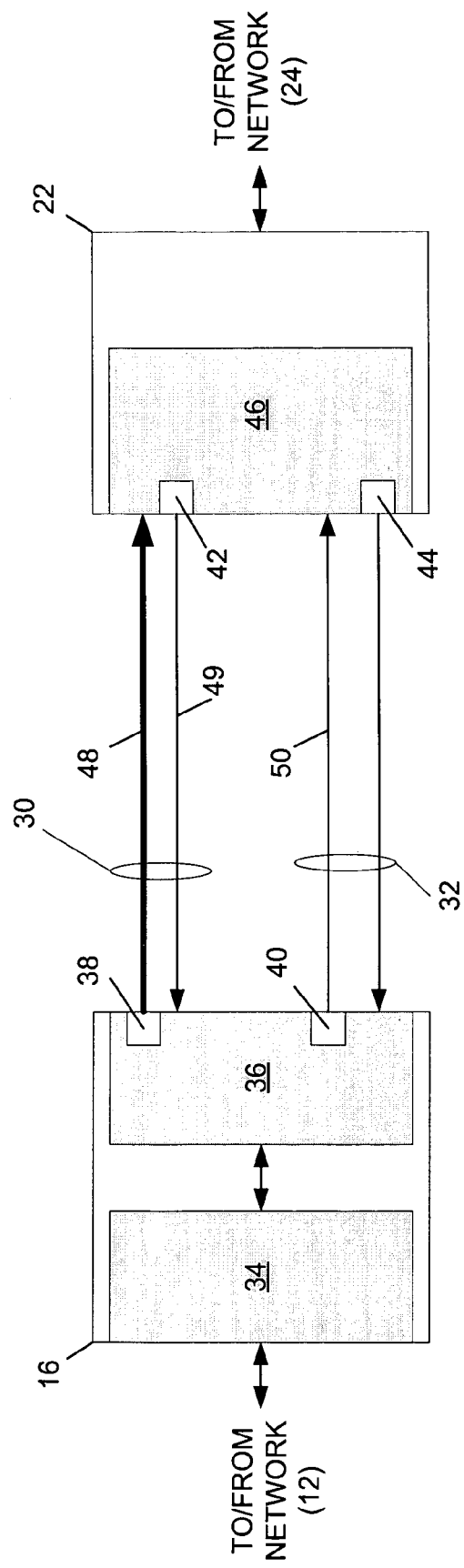
FIG. 2 is a block diagram of a network element in communication with data equipment over a plurality of Ethernet links.

FIG. 2 shows the sink network element 16 in communication with the data equipment 22 by way of a plurality of point-to-point links 30, 32. In one embodiment, the links 30, 32 are optical links with each link 30, 32 including a pair of optical fibers: one fiber for transmitting and the other fiber for receiving optical signals. The principles of the invention may be practiced over electrical links (1000BaseT links), provided the particular Ethernet protocol controlling communications over such links operates to cause the data equipment 22 to alert the sink network element 16 (e.g., with an auto-negotiation sequence) upon the detection of the loss of an electrical signal.

The network element 16 includes a "WAN-side" interface 34 and a "LAN-side" protected Ethernet interface 36. The protected Ethernet interface 36 includes a plurality of Ethernet ports 38, 40 (in FIG. 2, the reference numerals point to the transmitting portion of the respective ports). The data equipment 22 includes an Ethernet interface 46 having a plurality of Ethernet ports 42, 44 for receiving the Ethernet service traffic from the network element 16. Link 30 connects port 38 of the network element 16 to port 42 of the data equipment 22, whereas link 32 connects port 40 of the network element 16 to port 44 of the data equipment 22.

The protection mechanism of the invention protects the span between the network element 16 and the data equipment 22. Typically, the network element 16 and data equipment 22 are adjacent nodes; although, in some networks, one or more regenerators or repeaters may intervene without altering the operation of the protection mechanism described herein.

The links 30, 32 between the network element 16 and the data equipment 22 comprise a working-standby pair: one link, called a working link, carries Ethernet service traffic, while the other link, called a standby link, is inactive (i.e., not transmitting Ethernet traffic). Thus, unlike a SONET or SDH interface in which both transmitters in the 1+1 protected pair are active, the protected Ethernet interface 36 allows only one port to forward Ethernet service traffic at any given time—thus avoiding any problems associated with identical packets arrive at the data equipment 22. As described herein, the protected Ethernet interface 36 uses one of two mechanisms to ensure that only one port is transmitting Ethernet service traffic at a given time: (1) turn off the laser of the standby port, which results in no signaling on the standby link, or (2) disable data transmission of the standby port, which results in idle signaling on the standby link. In some instances, the transmit laser cannot be turned off at the standby port because this may cause initiation of the auto-negotiation sequence and result in the loss of the secondary path. Other mechanisms for preventing the standby port from transmitting Ethernet service traffic can be used without departing from the principles of the invention.

FIG. 2 illustrates normal (pre-protection switch) operation, wherein port 38 of the network element 16 transmits Ethernet service traffic to the data equipment 22 over optical fiber 48, while port 40 is sending idle signals, as an example, to port 44 over optical fiber 50. If, instead, the laser of port 40 is off, an administrator can mask certain alarms at the data equipment 22 or place port 44 out-of-service to account for the lack of any optical signals arriving at port 44. For unidirectional traffic, i.e., from the network element 16 to the data equipment 22, the data equipment 22 returns idle packets 49 towards the network element 16. If traffic is bidirectional, in one embodiment the data equipment 22 transmits identical Ethernet streams on links 30, 32 to network element 16. Protection switching can be unidirectional (for Ethernet service traffic passing from node 16 to node 22) or bi-directional (for Ethernet service traffic passing in both directions).

In general, to support Ethernet protection switching the network element 16 includes mechanisms for (1) detecting WAN-side and LAN-side switch-triggering signals or events, as described below, (2) determining which ports are working ports and which ports are standby ports, and (3) accomplishing the protection switch. An example of a network element that can be used to implement the network element 16 is the Optical Multiservice Edge 6500, developed by Nortel Networks Limited of Quebec, Canada.

As for the data equipment 22, mechanisms for supporting Ethernet protection switching include (1) detecting a fault in the communications from the network element 16 on the working link, (2) alerting the network element 16 of the fault (e.g., initiating an auto-negotiation sequence), and (3) having the capability to associate traffic from the same Ethernet service with multiple ports. An example of a network element that can be used to implement the data equipment 22 is the Passport 8600 Switch, also developed by Nortel Networks Limited. The Passport 8600 Switch has a port-based Virtual Local Area Networks (VLANs) capability that can be used to enable multiple ports to accept Ethernet traffic from the same Ethernet service. For port-based VLANs, an administrator explicitly configures each port to belong to a particular VLAN by assigning a VLAN identification number to the Ethernet service traffic and by specifying which ports belong to that VLAN.

Figure 3:
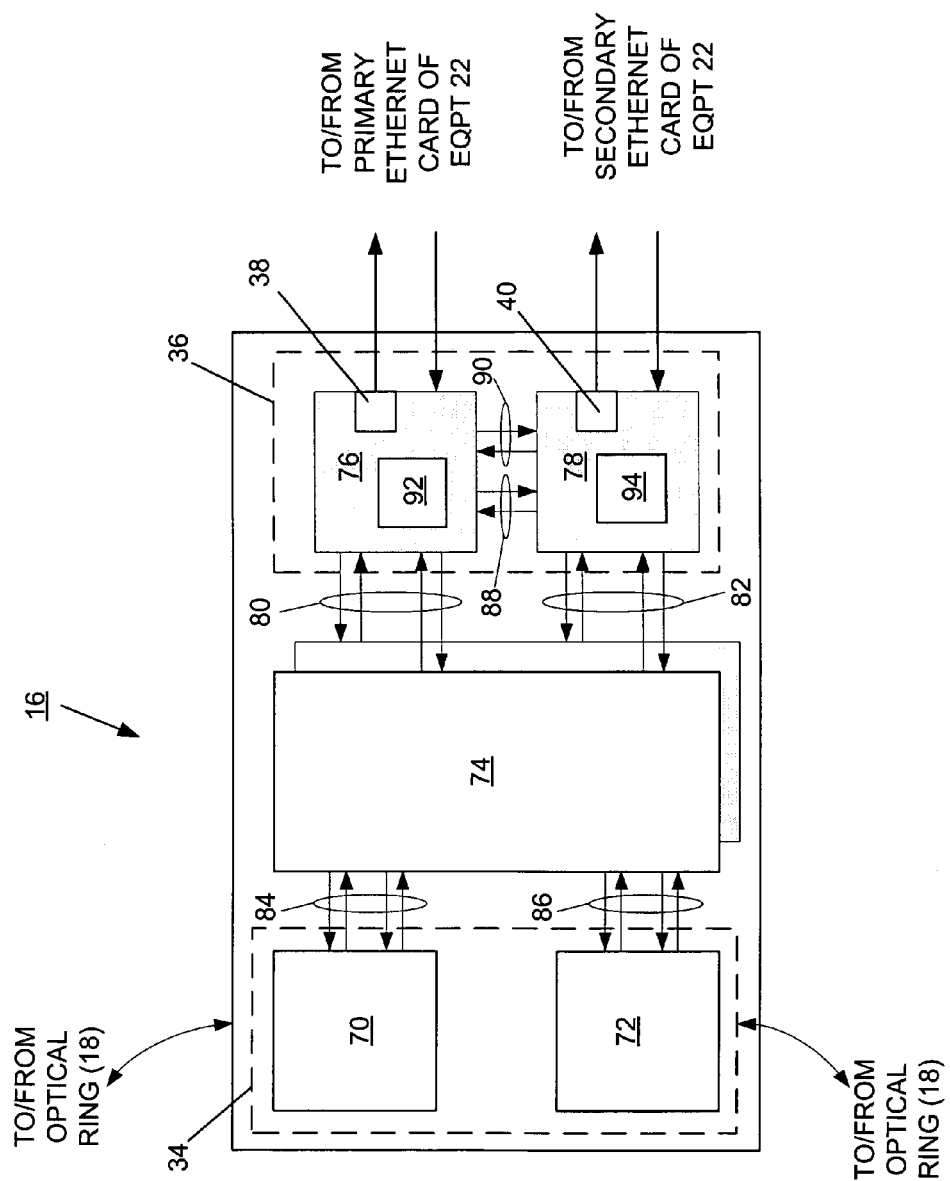
FIG. 3 is a block diagram of an embodiment of the first network element of FIG. 2.

FIG. 3 shows an embodiment of the sink network element 16 of FIG. 2 in more detail. The network element 16 includes optical port cards 70, 72, redundant cross-connect cards 74, the protected Ethernet interface 36 having two Gigabit Ethernet (GE) cards (or circuit packs) 76, 78. Each optical port card 70, 72 is coupled to the optical ring network 18 (FIG. 1) for receiving Ethernet service traffic therefrom. Each optical port card 70, 72 is also in communication with each cross-connect card 74 over signal lines 84, 86, respectively.

In communication with each cross-connect card 74 are the GE cards 76, 78 over signal lines 80, 82, respectively. The GE cards 76, 78 also communicate between themselves using signal lines 88 to negotiate which of two cards is the primary card and which is the secondary card, and signal lines 90 for coordinating an Ethernet protection switch through the exchange of card and link status information. To negotiate the primary and secondary roles, each GE card 76, 78 maintains a hardware-based finite state machine (FSM)—not shown. Based on indications of the FSMs, one GE card is the primary card and the other is the secondary card.

Each GE card 76, 78 also has software 92, 94, respectively. Typically, the primary GE card executes its copy of the software, although each GE card maintains a copy in the event that GE card should become the primary card. The software 92, 94 includes program code for determining which ports are working ports and which are standby ports for each GE card in the protected Ethernet interface 36. The ports of a given GE card 76, 78 can all be working ports, all be standby ports, or be a combination of working and standby ports. In general, each GE card receives an identical feed of Ethernet service traffic (the identical feeds may be redundant Ethernet streams arriving as such from the optical transport network 12 or duplicate Ethernet streams broadcast by a cross-connect card 74). A working port forwards its feed of Ethernet service traffic, whereas a standby port is turned off or has data transmission disabled (i.e., idle). The software 92, 94 also includes program code for detecting WAN-side and LAN-side switch-triggering signals or events and for coordinating a protection switch between the working and standby ports.

In general, protection is provided on a per-port basis. In FIG. 3, for example, standby port 40 protects working port 38. This example also illustrates equipment protection in that the secondary GE card 78 can protect the primary GE card 76 in the event of an equipment failure.

Figure 4:
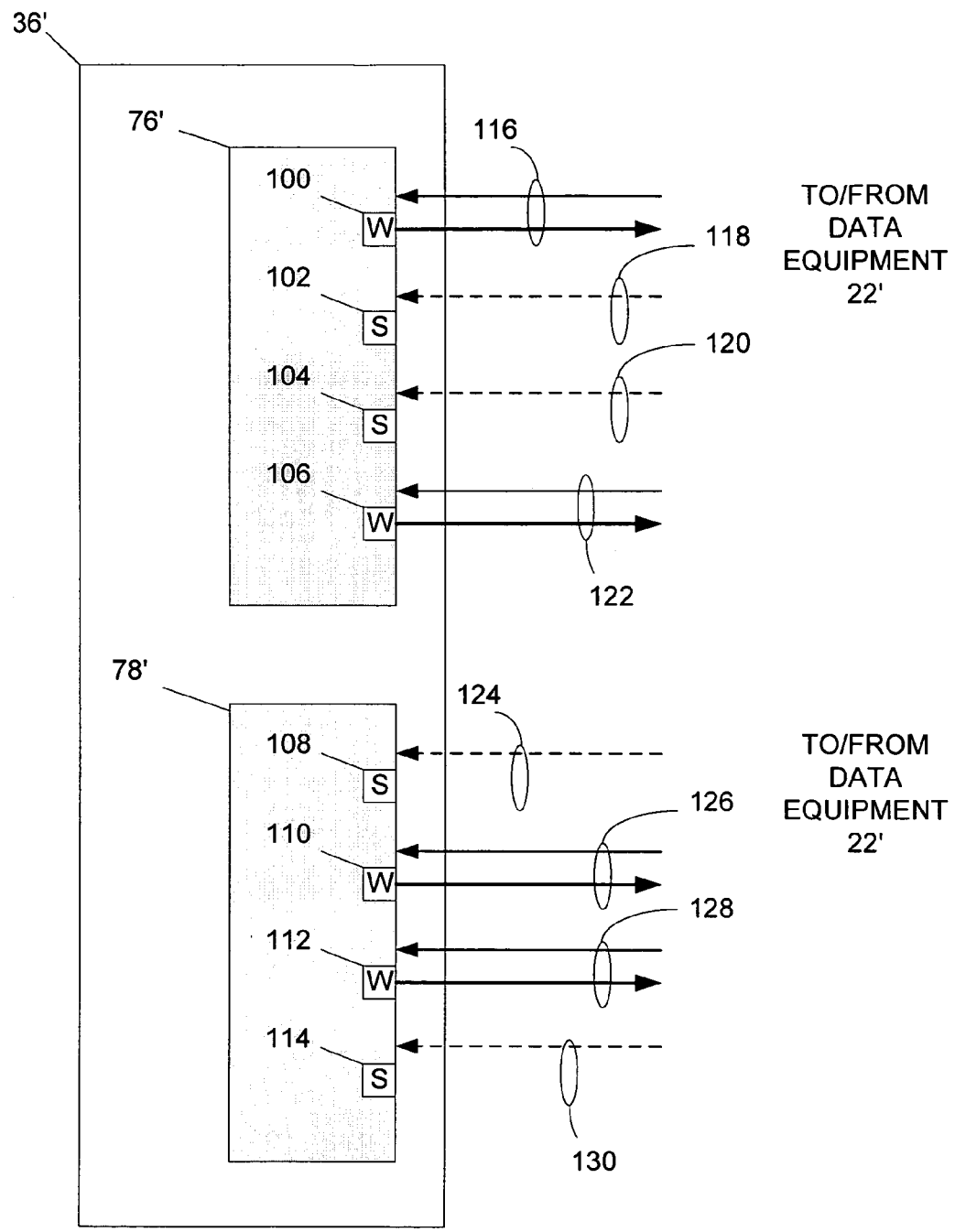
FIG. 4 is a block diagram of an embodiment of an Ethernet interface used to illustrate equipment protection and port protection.

FIG. 4 provides additional illustrations of link and equipment protection. In FIG. 4, an embodiment of a protected Ethernet interface 36' includes a pair of GE cards 76', 78'. Each GE card 76', 78' has a combination of working (W) and standby ports (S). GE card 76' has four GE ports 100, 102, 104, and 106; GE card 78' has GE ports 108, 110, 112, and 114.

In this example, ports 100, 106 of GE card 76' and ports 110, 112 of GE card 78' are working ports and forward Ethernet service traffic over a respective link 116, 122, 126, and 128. Each of such links 116, 122, 126, and 128 carries unique Ethernet service traffic (i.e., being identified with a different VLAN). Ports 102, 104 of GE card 76' and ports 108, 114 of GE card 78' are standby ports, and, in this example, have their transmit lasers turned off. Data equipment 22' in communication with this protected Ethernet interface 36' returns auto-negotiation signals over the respective links 118, 120, 124, and 130.

As one example of port assignments, port 108 can be configured to protect port 100, port 102 to protect port 110, port 104 to protect port 112, and port 114 to protect port 106. Such a configuration provides port and equipment protection. For example, if port 100 of the GE card 76' fails, the Ethernet traffic switches to port 108 of the GE card 78'. In the case of a circuit pack failure, Ethernet service traffic is switched from all ports in the failed circuit pack. For example, if the GE card 78' fails, Ethernet service traffic on port 110 and on port 112 switches to ports 102 and 104, respectively.

Corresponding ports of the data equipment 22' (not shown) are configured to receive Ethernet service traffic from the various ports of the GE cards 76', 78. For example, consider that an administrator associates VLAN ID #1 to the Ethernet service traffic forwarded over link 116, VLAN ID #2 with traffic forwarded over link 122, VLAN ID #3 with traffic forwarded over link 126, and VLAN ID #4 with the traffic forwarded over link 128. To support protection switching for these Ethernet traffic streams using the working-standby port protection pairs described above, the data equipment port in communication with port 100 over link 116 and the data equipment port in communication with port 108 over link 124 are both specified to belong to VLAN #1. Similarly, data equipment ports in communication with port 102 over link 118 and with port 110 over link 126 are both specified to belong to VLAN #2; data equipment ports in communication with port 104 over link 120 and with port 112 over link 128 are both specified to belong to VLAN #3; and data equipment ports in communication with port 106 over link 122 and with port 114 over link 130 are both specified to belong to VLAN #4.

Although port assignments that provide both link and equipment protection are preferable, link protection (without equipment protection) can be accomplished with a single GE card. Consider, for example, an alternative configuration of the ports in FIG. 4, wherein the port 102 is assigned to protect port 100, port 104 to protect port 106, port 108 to protect port 110, and port 114 to protect port 112. In this instance, standby ports on the GE card 76' protect working ports on the same GE card 76', and standby ports on the GE card 78' protect working ports on the same GE card 78'; but this configuration does not protect in the event of equipment failure of one of the GE cards 76', 78'.

Figure 5A:
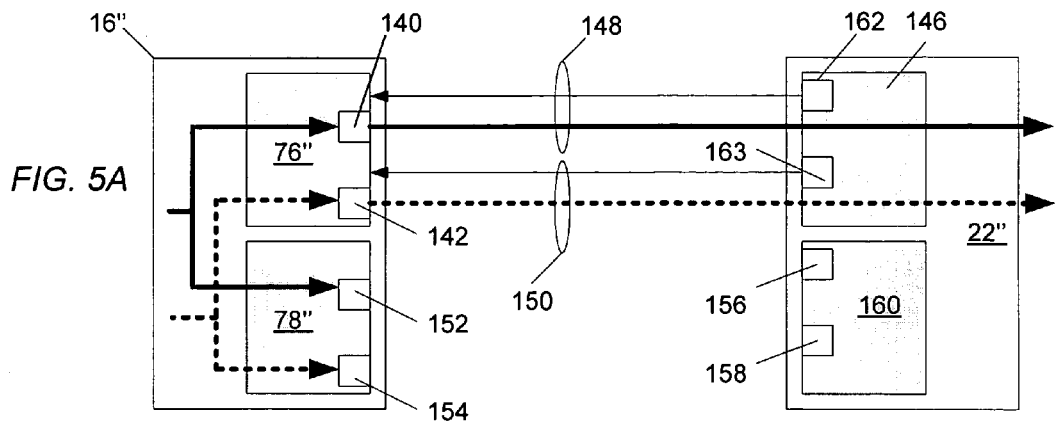
FIGS. 5A-5C are block diagrams sequentially illustrating Ethernet protection switching involving user intervention.
Figure 5B:
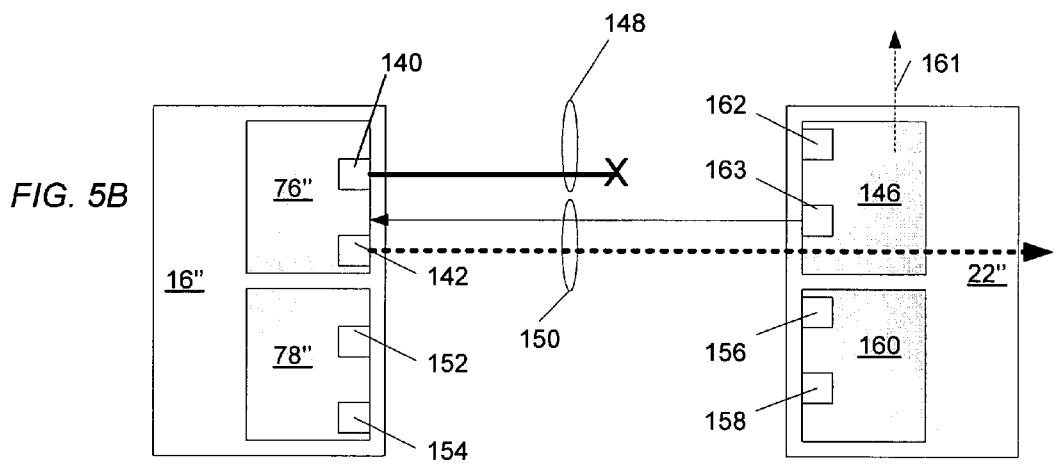
Figure 5C:
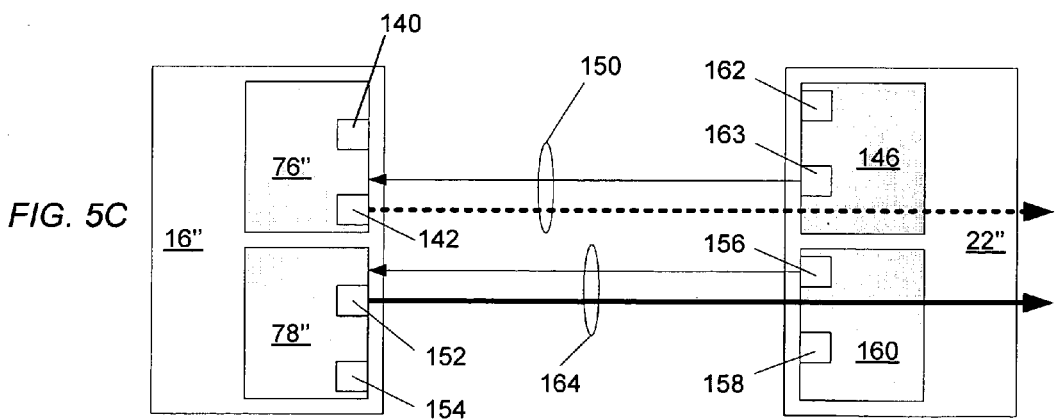

FIGS. 5A-5C shows a sequence of block diagrams that illustrate Ethernet protection switching involving user intervention. In this sequence, a network element 16" is in communication with data equipment 22". The network element 16" includes two GE cards 76", 78"; here, GE card 76" is the primary card, and GE card 78" is the secondary card. The data equipment 22" includes GE cards 146, 160.

In FIG. 5A, working ports 140, 142 of GE card 76" are forwarding Ethernet service traffic to ports 162, 163, respectively, of the GE card 146 of the data equipment 22" over links 148, 150, respectively. The Ethernet service traffic forwarded over link 148 is different from that forwarded over link 150 (i.e., two independent Ethernet streams). Working port 140 and standby port 152 of the network element 16" receive identical feeds of Ethernet service traffic (initially forwarded over link 148), and working port 142 and standby port 154 receive identical feeds of Ethernet service traffic (initially forwarded over link 150). An administrator configures the standby ports 152, 154 of the GE card 78" as out-of-service (i.e., turned off). To avoid raising alarms on the data equipment 22", the administrator can mask alarms or configure the ports 156, 158 on the GE card 160 as out-of-service.

FIG. 5B shows an equipment failure or fiber cut (denoted by an "X") affecting transmission of Ethernet service traffic over the link 148 and resulting in a loss of signal (LOS) during transmission to the data equipment 22". Port 162 of the data equipment 22" detects the LOS and raises an alarm 161.

FIG. 5C shows the result of a manually implemented protection switch. In response to the raised alarm, the administrator disables the transmit laser associated with port 140 by placing the facility as out-of-service. The administrator then places the port 152 of the secondary GE card 78" in service. Consequently, transmission of Ethernet service traffic to the data equipment 22" ceases over link 148 and commences over link 164 (in effect, implementing a protection switch). In addition, the transition from forwarding Ethernet service traffic from link 148 to link 164 does not affect the transmission of Ethernet service traffic over link 150. A potential shortcoming of a protection switch by user intervention, however, is that the process can be relatively slow, resulting in a lengthy service outage.

Figure 6A:
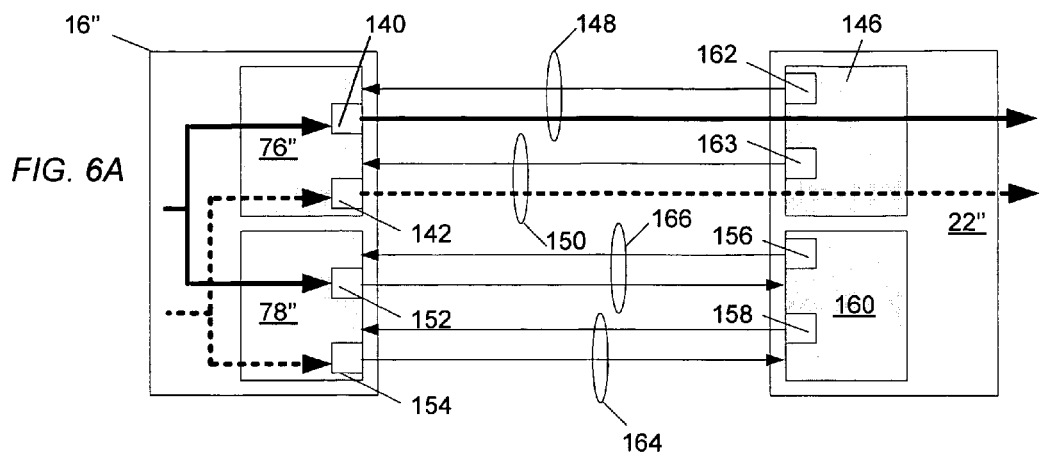
FIGS. 6A-6C are block diagrams sequentially illustrating an example of automated, unidirectional Ethernet protection switching.
Figure 6B:
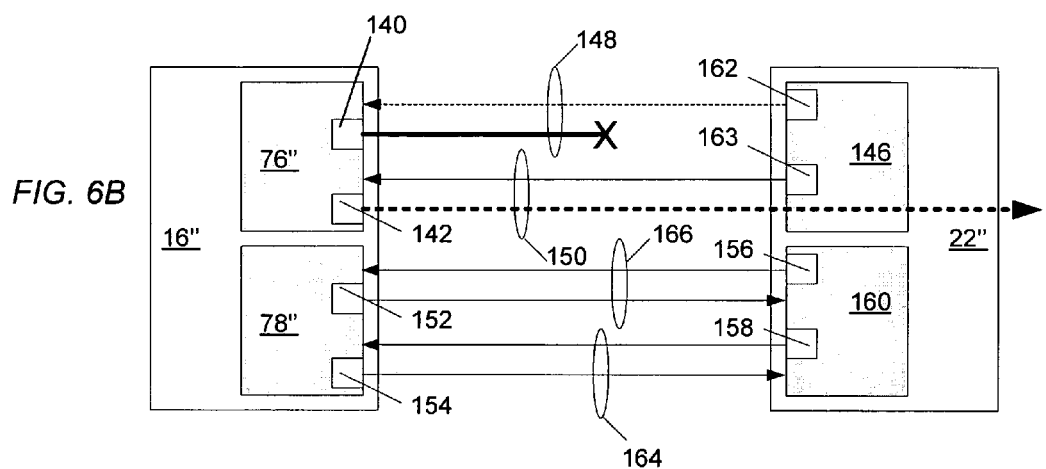
Figure 6C:
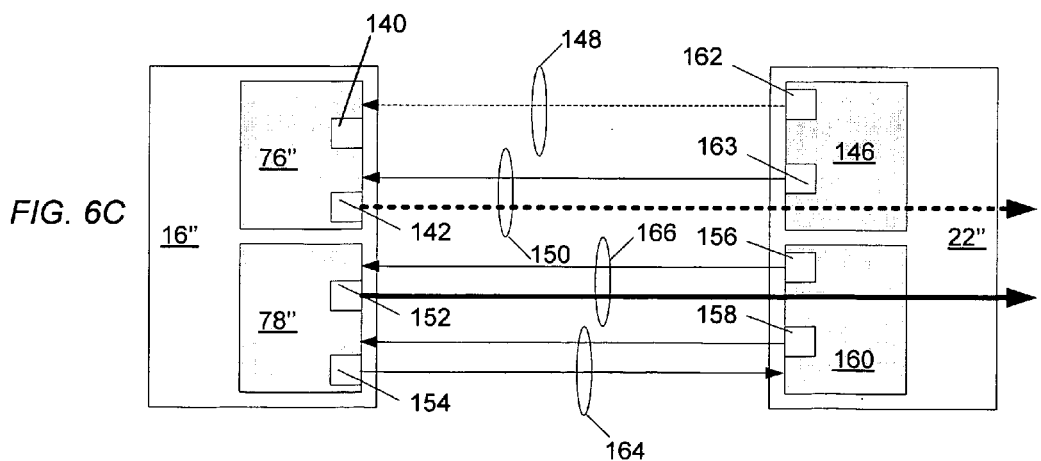

FIGS. 6A-6C show an automated embodiment of unidirectional Ethernet protection switching involving the network elements 16" and data equipment 22" described in connection with FIGS. 5A-5C. FIG. 6A shows ports 140, 142 forwarding Ethernet service traffic to the GE card 146 of the data equipment 22" over links 148, 150, respectively. Again, the Ethernet service traffic forwarded over link 148 is different from that forwarded over link 150 (i.e., two independent streams): working port 140 and standby port 152 of the network element 16" receive identical feeds of Ethernet service traffic (initially forwarded over link 148), and working port 142 and standby port 154 receive identical feeds of Ethernet service traffic (initially forwarded over link 150). With data transmission disabled, ports 152 and 154 are sending idle signals to ports 156, 158, respectively, of the secondary GE card 160 of the network element 22". For unidirectional traffic, ports 162, 163 of the GE card 146 and ports 156, 158 of the GE card 160 return idle packets to the network element over links 148, 150, 166, and 164, respectively.

FIG. 6B shows an equipment failure or fiber cut (denoted by an "X") affecting transmission of Ethernet service traffic over the link 148 and resulting in a loss of signal (LOS) during transmission to the data equipment 22". The data equipment 22" detects the LOS and initiates auto-negotiation (as denoted by the dashed arrow exiting port 162). (The data equipment 22" also raises an LOS alarm.) Auto-negotiation, as defined in IEEE standard 802.3z Standard clause 37 for optical Gigabit Ethernet, is a procedure by which two interfaces can advertise and negotiate modes of operation. Upon detecting a loss of signal (LOS) or loss of sync (LSYN) on its receiver, a GE card disables receipt of data, disables data transmission, and initiates the auto-negotiation sequence (renegotiation).

In one embodiment, the auto-negotiation sequence is used as a mechanism for triggering the protection switch. Upon detecting auto-negotiation signaling at port 140, the GE card 76" initiates a protection switch. Thus, the protection mechanism described herein establishes a new use for the auto-negotiation signaling, namely as a trigger for a protection switch. By using the auto-negotiation signaling for this purpose, currently produced and deployed network elements, such as the Passport 8600, can participate in Ethernet protection switching without the need of modification. In other embodiments, the primary GE card may look for a different type of signal from the data equipment 22", e.g., a Remote Fault (RF) indication, to operate as criteria for initiating the protection switch. Future network elements (and data equipment), designed with Ethernet protection switching in mind, may produce or look for a custom signal employed specifically for triggering a protection switch.

FIG. 6C shows the result of an automatically executed protection switch in response to the failure experienced by link 148. In response to the auto-negotiation signaling, the GE card 76" automatically disables data transmission for port 140 and enables the corresponding standby port 152 to start forwarding its feed of Ethernet service traffic. Accordingly, port 156 of the secondary GE card 160 of the data equipment 22" begins receiving Ethernet service traffic over link 166. Consequently, the forwarding of Ethernet service traffic to the data equipment 22" transitions from link 148 to link 164. In addition, this transition does not affect the transmission of Ethernet service traffic over link 150 or the standby state of link 164.

FIGS. 6A-6C illustrate one example of a cause for a protection switch; however, protection switches can occur for a variety of reasons (i.e., triggers). In general, the network element 16" can detect certain triggers on the WAN-side, and other triggers on the protected Ethernet side (also referred to as the LAN-side). On the WAN-side, Signal Fail triggers include client management frame (CMF) failure indications and AIS-P (alarm indication signal—Path) or UNEQ-P (unequipped path) signals. On the LAN-side, Signal Fail triggers can include loss of signal (LOS), loss of sync (LSYN), auto negotiation (AN), idle traffic (IDLE), circuit pack failure (CP FAIL), and circuit pack out of service (OOS). Signal Degrade triggers can include a user-defined threshold based on the number of errored frames received.

Other protection switch triggers are not based on error indications. For example, an administrator can cause a forced switch or a manual switch to cause an Ethernet protection switch. To induce a forced or manual switch, the administrator can issue commands to the network element to disable transmit data or turn off the laser of the transmitting port. The protection switch will subsequently begin when the port detects auto-negotiation signaling on the link coming from the data equipment (which is responding to the loss of signal on the link).

FIGS. 6D-6F show an embodiment of automated bidirectional Ethernet protection switching involving the network elements 16" and data equipment 22". For purposes of illustrating bidirectional Ethernet protection switching, the network element 16" and data equipment 22" exchange four independent streams of Ethernet service traffic: (1) working port 140 and standby port 152 of the network element 16" receive identical feeds of a first Ethernet stream; (2) working port 142 and standby port 154 receive identical feeds of a second Ethernet stream; (3) working port 162 and standby port 156 of the data equipment 22" receive identical feeds of a third Ethernet stream; and (4) working port 163 and standby port 158 of the data equipment 22" receive identical feeds of a fourth Ethernet stream.

In the forward direction (node 16" to node 22"), for each independent stream, the primary GE card selects the port over which to forward the Ethernet service traffic. In FIG. 6D, the primary GE card forwards one independent stream (solid arrow) from port 140 over link 148 and forwards a second independent stream (dashed arrow) from port 142 arriving over link 150. With data transmission disabled, standby ports 152 and 154 are transmitting idle packets to ports 156, 158, respectively.

In the reverse direction, the primary GE card of the network element 16" monitors the identical traffic (solid arrows) arriving from the data equipment 22" on both ports 140, 152, e.g., for LOS and LSYN fault indications, to determine and select the better of the two streams. (Similar determination is made between the streams of Ethernet service traffic (dashed arrows) arriving on ports 142 and 154). In FIG. 6D, the primary GE card selects the stream arriving over link 148 (instead of the stream arriving over link 166) and selects the stream arriving over link 150 (instead of the stream arriving over link 164). Each standby port 152, 154 squelches the packets received (from the data equipment 22") corresponding to its respective, unselected stream.

In FIG. 6E, the primary GE card of the network element 16" determines that the Ethernet stream arriving at port 140 over link 148 is degraded or failed (denoted by an "X") and initiates a protection switch. The GE card 76" also initiates the auto-negotiation sequence (represented by the dashed arrow exiting port 140).

FIG. 6F shows the result of an automatically executed protection switch in response to the failure detected on link 148 (described in FIG. 6E). To accomplish the protection switch, the primary GE card automatically disables bidirectional transmission and reception of Ethernet traffic at port 140 and enables bidirectional transmission and reception of Ethernet traffic at the corresponding standby port 152. Accordingly, after the protection switch, port 152 is forwarding Ethernet service traffic (received from the WAN-side) to port 156 of the data equipment 22" over link 166, and forwarding Ethernet service traffic to the WAN-side (received from port 156 of the data equipment 22" over link 166). Again, this protection switch does not affect the bidirectional transmission of Ethernet service traffic over link 150 or the standby state of link 164.

To support the extension of the Ethernet protection switching mechanism described herein to 1:N protection, wherein one standby port serves to protect N working ports, a hierarchy of switching priorities can be used to control which type of protection switch, if any, has precedence. From highest to lowest priority, one example of a hierarchy of switching priorities is: (1) Lockout of Protection, (2) Forced Switch, (3) Signal Fail, (4) Signal Degrade, (5) Manual Switch, (6) Wait to Restore, and (7) No Request.

For example, if a standby port supporting N working ports is, as a result of a manual switch, forwarding Ethernet traffic when another of the N working ports experiences a Signal Fail condition, then the protected Ethernet interface will perform a protection switch to cause the standby port to protect the Ethernet service traffic of the working port experiencing the Signal Fail. (Signal Fail has a higher switching priority than manual switch). If, subsequently, still another of the N working ports experiences a Signal Degrade, in this case the protected Ethernet interface does not perform a protection switch because a Signal Degrade has a lower switching priority than a Signal Fail. The standby port continues to forward Ethernet service traffic in support of the working port that experienced the Signal Fail.

Figure 7A:
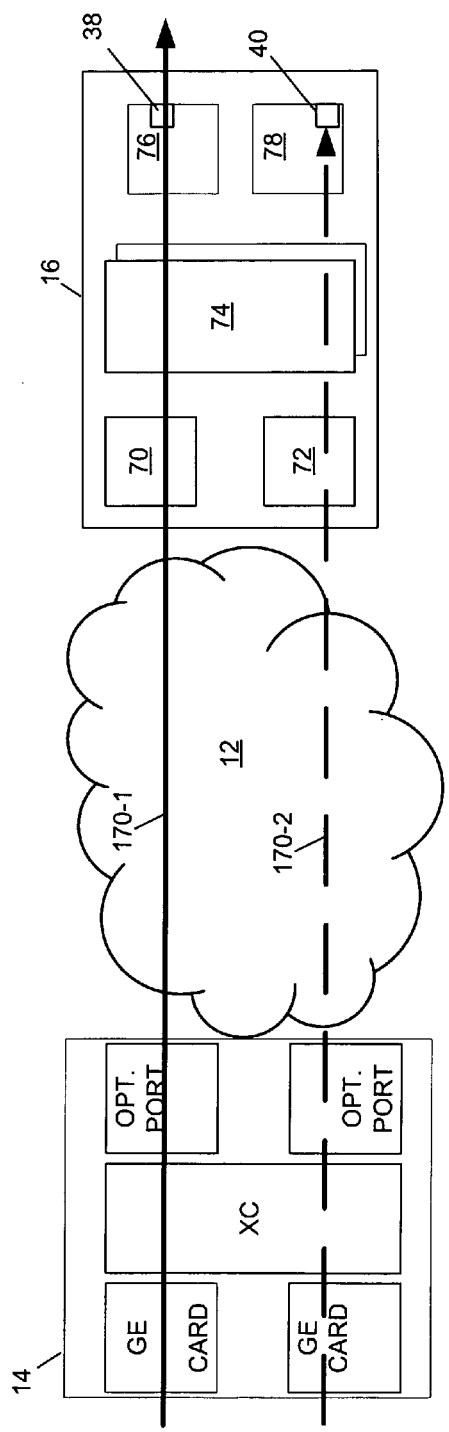
FIGS. 7A-7C are block diagrams showing a first (source) network element forwarding identical Ethernet streams to a second (sink) network element over the optical transport network of FIG. 1.

The protection mechanism of the invention can work in conjunction with a variety of protection schemes employed by the optical transport network. FIG. 7A shows an example of identical streams of Ethernet service traffic 170-1, 170-2 being forwarded from the source network element 14 to the sink network element 16 through the optical transport network 12. At the sink network element 16, one Ethernet stream 170-1 is dropped to the first GE card 76, and the other Ethernet stream 170-2 is dropped to the second GE card 78. The primary GE card monitors WAN-side for failure indications, such as CMF failure indication, AIS-P, and UNEQ-P, and the LAN-side for receiver (Rx) failure indications, such as LOS, LSYN, and the auto-negotiation sequence. The software (FIG. 3) determines the better of the two feeds and enables the associated GE port. In this example, the port 38 on the first GE card 76 forwards the Ethernet stream 170-1, the port 40 on the second GE card 78 is either turned off or transmit data has been disabled (the Ethernet stream at the second GE card 78 is discarded).

Figure 7B:
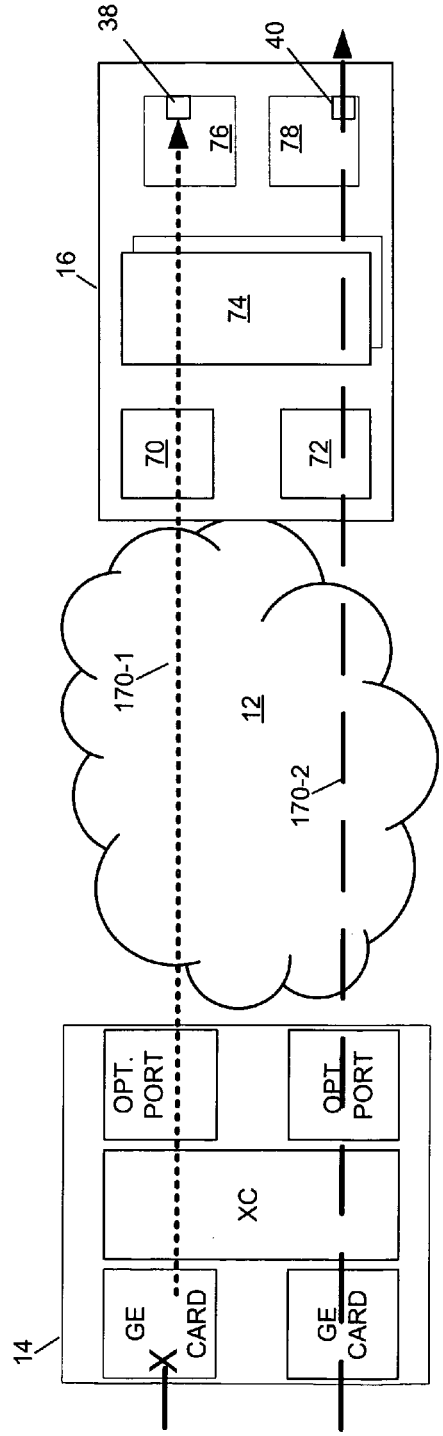

FIG. 7B shows an example of a protection switch in response to a failure detected by the network element 14 affecting the stream 170-1 of FIG. 7A. The network element 14 detects a failure (denoted by an "X") and transmits CMF failure indications over the optical transport network 12. The primary GE card detects the CMF failure indication in the stream 170-1 and initiates a protection switch. As a result, the transmit laser of the port 38 is disabled, and the transmit laser of the port 40 is enabled. Port 40 of the second GE card 78 thus becomes the active port for transmitting Ethernet traffic. Although shown herein as unidirectional, protection switching can also be bidirectional, with identical Ethernet streams flowing from the sink network element 16 to the source network element 14, and only one of the ports of the source network element 14 forwarding its Ethernet stream (to the LAN 20).

Figure 7C:
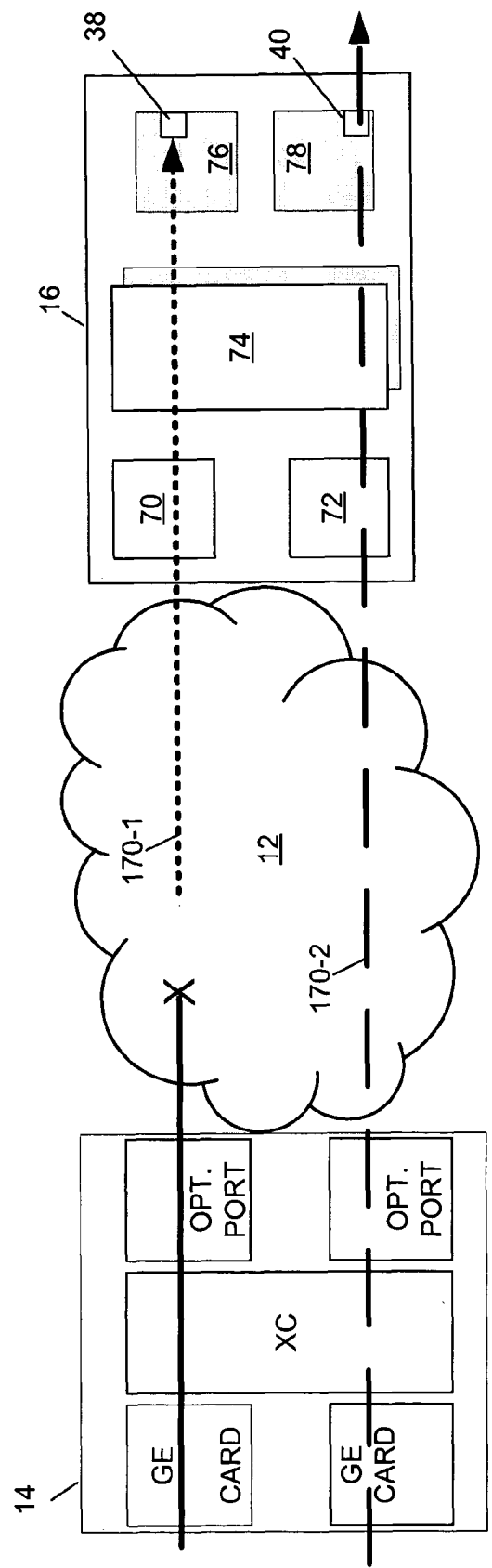

FIG. 7C shows another example of a protection switch performed in response to a failure affecting the stream 170-1 of FIG. 7A. This failure is detected within the optical transport network 12, which results in AIS signals being inserted into the Ethernet stream 170-1. The primary GE card on the sink network element 16 detects the AIS-P signal and initiates a protection switch, with results similar to those described in FIG. 7B.

Figure 8A:
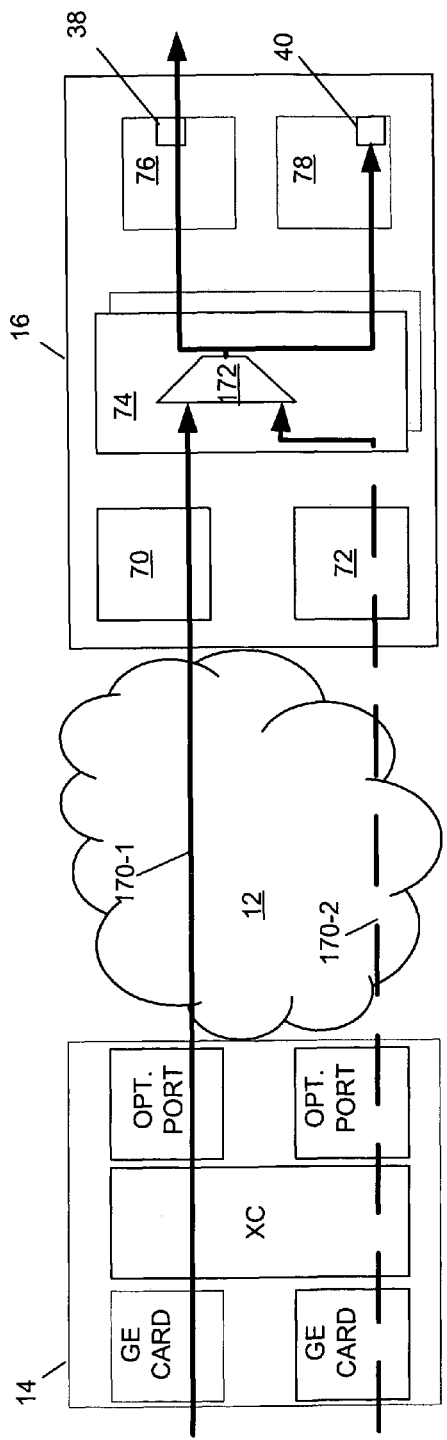
FIGS. 8A-8B are block diagrams showing a first (source) network element forwarding identical Ethernet streams to a second (sink) network element over the optical transport network configured as a Unidirectional Path Switched Ring/Subnetwork Connection Protection (UPSR/SNCP) network.

FIG. 8A shows another example of identical streams of Ethernet service traffic 170-1, 170-2 being forwarded from the source network element 14 to the sink network element 16 through the optical transport network 12. In this example, UPSR/SNCP (Unidirectional Path Switched Ring/Subnetwork Connection Protection) path closure is used to select a stream to forward to the GE cards 76, 78. More specifically, at the sink network element 16, the cross-connect card 74 receives both Ethernet streams 170-1, 170-2 and monitors each stream for failures. A selector 172 selects the better of the Ethernet streams, and broadcasts the selected stream to both GE cards 76, 78. The primary GE card monitors the LAN-side for receiver (Rx) failure indications, such as LOS, LSYN, and the auto-negotiation sequence, and equipment failures. Based on the LAN status and equipment status, software determines the better of the two ports and enables that port. In this example, the port 38 on the first GE card 76 forwards the selected Ethernet stream, while the port 40 on the second GE card 78 is either turned off or transmit data has been disabled (the Ethernet stream at the second GE card 78 is discarded).

Figure 8B:
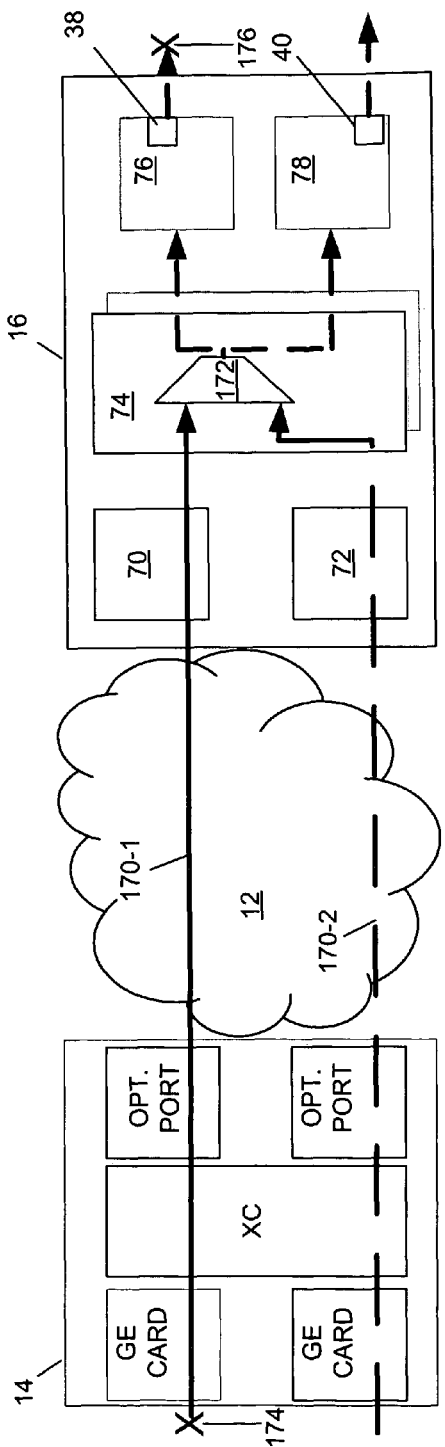

FIG. 8B shows an example of an Ethernet stream selection followed by a protection switch in response to a failure detected by the source network element 14 affecting the stream 170-1 of FIG. 8A. LAN failure at the client network (denoted by X 174) results in AIS-P or UNEQ-P signals being inserted on the optical transport network 12. The sink network element 16 detects the path conditioning signals. In response, the cross-connect card 74 selects the alternate Ethernet stream 170-2. Both GE cards 76, 78 receive a broadcast of the selected Ethernet stream 170-2. Initially, the port 38 on the first GE card 76 forwards the selected Ethernet stream 170-2, while the port 40 on the second GE card 78 is either turned off or transmit data has been disabled. A protection switch occurs when the first GE card 76 detects an auto-negotiation sequence resulting from a transmit failure (denoted by X 176). As a result of the protection switch, port 38 ceases transmitting its feed of the selected Ethernet stream 170-2 and port 40 of the second GE card 78 forwards its feed of the selected Ethernet stream 170-2.

Figure 9:
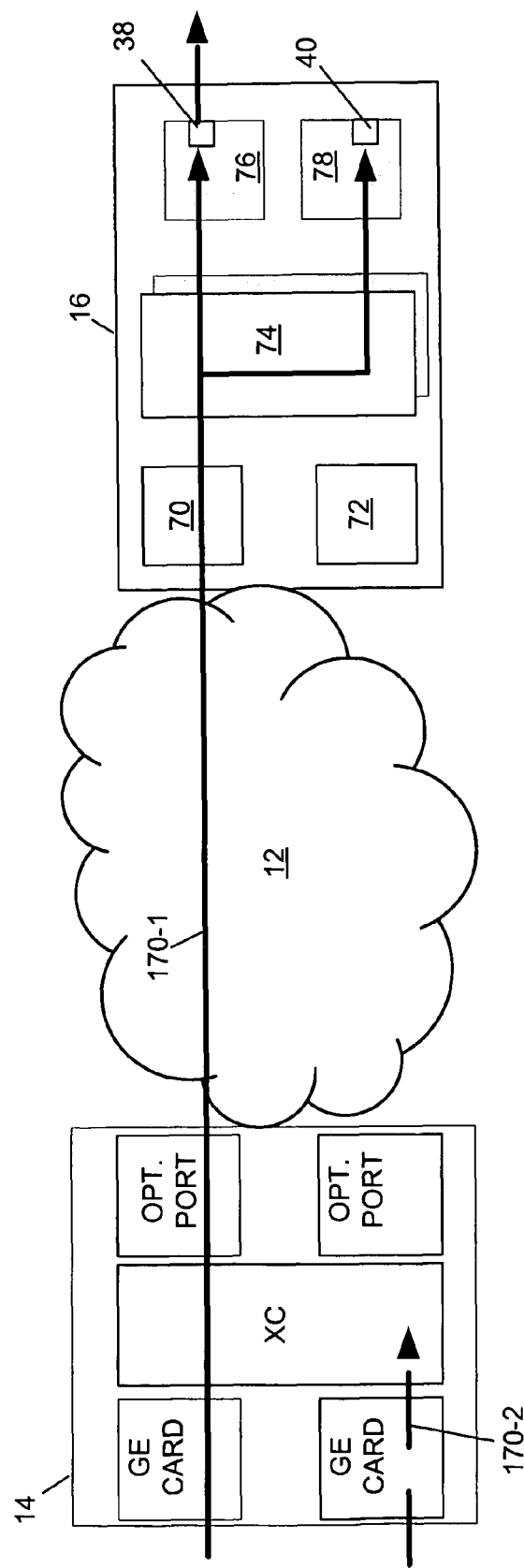
FIG. 9 is a block diagram showing a first (source) network element selecting and forwarding one of two identical Ethernet streams to a second (sink) network element over the optical transport network configured as a Bidirectional Line Switched Ring/Multiplex Section Shared Protection Ring (BLSR/MS-Spring) network

FIG. 9 shows an example of one stream of Ethernet service traffic FIGS. 170-1 being forwarded from the source network element 14 to the sink network element 16 through the optical transport network 12. In this example, the optical transport network 12 is configured as a BLSR/MS-SRRing network. The source network element 14 receives identical streams of Ethernet traffic 170-1, 170-2, selects one of the streams, and forwards that selected stream through the BLSR/MS-Spring network. At the sink network element 16, the cross-connect card 74 broadcasts the selected stream to both GE cards 76, 78.

The primary GE card monitors the LAN-side for receiver (Rx) failure indications, such as LOS, LSYN, and the auto-negotiation sequence, and equipment failures. Based on the LAN status and equipment status, the software on the primary GE card determines the better of the two ports and enables that port. In this example, the port 38 on the first GE card 76 forwards the selected Ethernet stream, while the port 40 on the second GE card 78 is either turned off or transmit data has been disabled.

FIGS. 10A-10B show different embodiments of Ethernet protection interfaces 200 and 200' that provide 1:N protection. In FIG. 10A, the Ethernet protection interface includes a first GE card 202 and a second GE card 204. Each GE card 202, 204 has four ports: the first GE card 202 has ports 206, 208, 210, and 212; the second GE card 204 has ports 214, 216, 218, and 220. In this embodiment, the assignment of the ports of each GE card 202, 204 provides 1:3 protection for the ports (although not equipment protection). More specifically, on the first GE card 202, ports 206, 208 and 210 are working ports and port 212 is a standby port. If a protection switch is initiated for any one of the working ports 206, 208 and 210, the forwarding of Ethernet service traffic, previously forwarded by that working port, transitions to the standby port 212. Similarly, on the second GE card 204, ports 214, 216 and 218 are working ports and port 220 is a standby port, and if a protection switch is initiated for one any of the working ports 214, 216 and 218, the Ethernet service traffic switches to the standby port 220.

To support 1:N Ethernet protection, each data equipment port (not shown) configured to receive Ethernet service traffic from a standby port, belongs to multiple VLANs. For example, consider that an administrator associates VLAN ID #1 to the Ethernet service traffic forwarded over link 250, VLAN ID #2 with the Ethernet service traffic forwarded over link 252, and VLAN ID #3 with the Ethernet service traffic forwarded over link 254. To support protection switching, the port in communication with the standby port 212 over link 256 is specified to belong to VLAN #1, VLAN #2, and VLAN #3, so that the data equipment port can receive Ethernet service traffic from any of the streams being forwarded over the working links 250, 252, 254.

In FIG. 10B, the Ethernet protection interface 200' includes a first GE card 222, a second GE card 224, a third GE card 226, and a fourth GE card 228. Each GE card 222, 224, 226, and 228 includes two ports. Both ports of the first, second, and third GE cards are working ports, whereas both ports of the fourth GE card are standby ports.

The standby port 242 of the fourth GE card 228 provides 1:3 protection for the working ports 230, 234, and 238 of the first, second, and third GE cards 222, 224, and 226, respectively. If a protection switch is initiated for any one of the working ports 230, 234, and 238, the forwarding of Ethernet service traffic, previously forwarded by that working port, transitions to the standby port 242. Similarly, the standby port 244 provides 1:3 protection for the working ports 232, 236, and 240 of the first, second, and third GE cards 222, 224, 226, respectively. If a protection switch is initiated for any of the working ports 232, 236, and 240, the Ethernet service traffic switches to the standby port 244. The examples presented in FIGS. 10A and 10B are merely illustrative of 1:N protection. Other 1:N protection configurations can be employed in the practice of the protection mechanism of the invention.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A method of protection switching in an Ethernet network, the method comprising:
    establishing a first point-to-point Ethernet link to a remote data equipment via a first Ethernet port;
    establishing a second point-to-point Ethernet link to the remote data equipment via a second Ethernet port;
    during normal data transmission times, receiving identical streams of Ethernet traffic for forwarding to the remote data equipment at both the first Ethernet port and the second Ethernet port, the identical streams being received from other than the first and second point-to-point Ethernet links;
    during normal data transmission times, transmitting the stream of Ethernet traffic being received at the first Ethernet port to the remote data equipment over the first point-to-point Ethernet link, while preventing the second Ethernet port from transmitting the stream of Ethernet traffic received at the second Ethernet port over the second point-to-point Ethernet link;
    detecting auto-negotiation signaling on the first point-to-point Ethernet link, the auto-negotiation signaling being from the remote data equipment and indicating that the first point-to-point Ethernet link is inoperable; and
    in response to detecting the auto-negotiation signaling, ceasing transmission of the stream of Ethernet traffic received at the first Ethernet port to the remote data equipment over the first point-to-point Ethernet link, and commencing transmission of the stream of Ethernet traffic being received at the second Ethernet port to the remote data equipment over the second point-to-point Ethernet link.

2. The method of claim 1, further comprising the step of receiving, from the remote data equipment over the first point-to-point Ethernet link, a signal indicating detection, by the remote data equipment, of a fault affecting transmission of Ethernet traffic to the remote data equipment over the first point-to-point Ethernet link, and wherein the steps of ceasing and commencing occur in response to receiving the signal.

3. The method of claim 1, wherein the steps of ceasing and commencing occurs in response to a fault indication associated with the stream of Ethernet traffic received at the first Ethernet port.

4. The method of claim 1, wherein the identical streams are received from an optical transport network, the first and second point-to-point Ethernet links being part of the Ethernet network, and the Ethernet network being other than the optical transport network.

5. The method of claim 1, further comprising the step of disabling data transmission at the second Ethernet port to cause idle signaling to pass to the remote data equipment over the second point-to-point link, while transmitting Ethernet traffic from the first Ethernet port to the remote data equipment over the first point-to-point Ethernet link.

6. The method of claim 1, further comprising the step of turning off a transmit laser at the second Ethernet port so that no signals pass to the remote data equipment over the second point-to-point Ethernet link, while transmitting Ethernet traffic from the first Ethernet port to the remote data equipment over the first point-to-point Ethernet link.

7. The method of claim 1, further comprising the step of reverting to transmitting the stream of Ethernet traffic received at the first Ethernet port to the remote data equipment over the first point-to-point Ethernet link.

8. The method of claim 1, further comprising the step of inducing a protection switch by terminating transmission of Ethernet service traffic from the first Ethernet port over the first point-to-point link.

9. A network element, comprising: a first Ethernet port establishing a first point-to-point Ethernet link to a remote data equipment; a second Ethernet port establishing a second point-to-point Ethernet link to the remote data equipment, the first and second Ethernet ports receiving identical streams of Ethernet traffic for forwarding to the remote data equipment during normal data transmission times, the identical streams being received from other than the first and second point-to-point Ethernet links;
    the network element having embedded therein computer executable instructions for transmitting the stream of Ethernet traffic received at the first Ethernet port to the remote data equipment over the first point-to-point Ethernet link while preventing the second Ethernet port from transmitting the steam stream of Ethernet traffic received at the second Ethernet port to the remote data equipment over the second point-to-point Ethernet link during normal data transmission times; and
    the network element having embedded therein computer executable instructions for detecting auto-negotiation signaling on the first point-to-point Ethernet link, the auto-negotiation signaling being from the remote data equipment and indicating that the first point-to-point Ethernet link is inoperable, and
    in response to detecting the auto-negotiating signaling performing a protection switch by ceasing transmission of the stream of Ethernet traffic received at the first Ethernet port to the remote data equipment over the first point-to-point Ethernet link, and commencing transmission of the stream of Ethernet traffic being received at the second Ethernet port to the remote data equipment over the second point-to-point Ethernet link.

10. The network element of claim 9, further comprising computer executable instructions for disabling data transmission at the second Ethernet port to cause idle signaling to pass to the remote data equipment over the second point-to-point link, while the first Ethernet port transmits Ethernet traffic to the remote data equipment over the first point-to-point Ethernet link.

11. The network element of claim 9, further comprising computer executable instructions for turning off a transmit laser at the second Ethernet port so that no signals pass to the remote data equipment over the second point-to-point Ethernet link, while the first Ethernet port transmits Ethernet traffic to the remote data equipment over the first point-to-point Ethernet link.

12. The network element of claim 9, further including a first optical port and a second optical port, the first and second optical ports being in communication with the first and second Ethernet ports; and
    the identical streams are received at the first and second optical ports from an optical transport network for forwarding to the first and second Ethernet ports.

13. The network element of claim 9, wherein the first and second Ethernet ports are on the same Ethernet card.

14. A network, comprising:
    a first network element; and
    a second network element being remote from the first network element, the second network element including:
        a working Ethernet port connected to the first network element over a first point-to-point Ethernet link; and
        a standby Ethernet port connected to the first network element over a second point-to-point Ethernet link, the working and standby Ethernet ports receiving identical streams of Ethernet traffic for forwarding to the first network element during normal data transmission times, the identical streams are received from other than the first and second point-to-point Ethernet links,
        the working Ethernet port being connected to the first network element over a first point-to-point Ethernet link and the standby Ethernet port being connected to the first network element over a second point-to-point Ethernet link; and
    a processor, the processor:
        causing the working Ethernet port to transmit the stream of Ethernet traffic being received at the first Ethernet port to the first network element over the first point-to-point Ethernet link while preventing the second Ethernet port from transmitting the stream of Ethernet traffic received at the second Ethernet port during normal data transmission times;
        detecting an auto-negotiation signal on the first point-to-point Ethernet link at the second network element, the auto-negotiation signaling being from the first network element and indicating that the first point-to-point Ethernet link is inoperable; and
        in response to detecting the auto-negotiation signal, causing the working Ethernet port to cease transmission of the stream of Ethernet traffic received at the first Ethernet port to the first network element over the first point-to-point Ethernet link, and causing the standby Ethernet port to commence transmission of the stream of Ethernet traffic being received at the second Ethernet port to the first network element over the second point-to-point Ethernet link.

15. The network of claim 14, wherein the processor further detects a fault indication associated with the stream of Ethernet traffic received at the working Ethernet port, and initiates the protection switch in response to detecting the fault indication.

16. The network of claim 14, wherein the processor further disables data transmission at the standby Ethernet port to cause idle signaling to pass to the first network element over the second point-to-point link, while the working Ethernet port transmits Ethernet traffic to the first network element over the first point-to-point Ethernet link.

17. The network of claim 14, wherein the the processor further turns off a transmit laser at the standby Ethernet port so that no signals pass to the first network element over the second point-to-point Ethernet link, while the working Ethernet port transmits Ethernet traffic to the first network element over the first point-to-point Ethernet link.

18. The method of claim 1, wherein the first and second Ethernet ports are each coupled to a first and second circuit card, the first and second circuit card configured to negotiate which of the two circuit cards is the primary card and which is the secondary card.

19. The method of claim 18, wherein the first and second circuit cards coordinate a protection switch by the exchange of card and link status information.

* * * * *